United States Patent [19]

Smith et al.

[11] 4,346,923
[45] Aug. 31, 1982

[54] APPARATUS FOR JOINING TUBING

[75] Inventors: Verity C. Smith, Dedham; Robert J. Baker, Pembroke; Wyile W. Barrow, Jr.; H. Daniel Doane, both of Duxbury, all of Mass.

[73] Assignee: Vaponics Inc., Plymouth, Mass.

[21] Appl. No.: 69,516

[22] Filed: Aug. 23, 1979

[51] Int. Cl.³ ............................................. F16L 17/02
[52] U.S. Cl. .................................... 285/340; 285/347; 285/354; 285/422
[58] Field of Search ............... 285/341, 342, 343, 348, 285/354, 382.7, 347, 422, 340

[56] References Cited

U.S. PATENT DOCUMENTS

| 2,158,757 | 5/1939 | Kuestermeier | 285/340 |
| 2,724,602 | 11/1955 | Carey | 285/354 |
| 3,437,357 | 4/1969 | Rubin | 285/342 |
| 3,521,910 | 7/1970 | Callahan et al. | 285/422 X |
| 3,542,405 | 11/1970 | Nalodka | 285/347 X |
| 3,698,744 | 10/1972 | Bevington | 285/416 X |
| 3,708,186 | 1/1973 | Takagi | 285/341 |
| 3,848,905 | 11/1974 | Hammer | 285/342 X |

FOREIGN PATENT DOCUMENTS 2321769 11/1974 Fed. Rep. of Germany ... 285/382.7

Primary Examiner—Dave W. Arola
Attorney, Agent, or Firm—Kenway & Jenney

[57] ABSTRACT

A leak-tight noncontaminative joint connecting a section of titanium, tantalum, zirconium or stainless steel tubing with second section of titanium, tantalum, zirconium or stainless steel tubing of a larger diameter is formed by placing a compressible O-ring, a slidable, nontitanium, nontantalum, nonzirconium or nonstainless steel ferrule and a fixed, nontitanium, nontantalum, nonzirconium or nonstainless steel mechanical stop around the outer surface of the smaller tubing and inserting the smaller tubing into the larger tubing so as to compress the O-ring between the two sections, until the ferrule, which conformably engages the inner surface of the larger tubing, is driven firmly against the mechanical stop. In this arrangement the fluid being transported within the titanium, tantalum, zirconium or stainless steel tubings is unable to pass by the O-ring and thus does not contact either the nontitanium, nontantalum, nonzirconium or nonstainless steel ferrule or stop. A coupling nut for holding the two joined pieces of tubing together is also disclosed.

1 Claim, 3 Drawing Figures

APPARATUS FOR JOINING TUBING

BACKGROUND OF THE INVENTION

This invention relates generally to a device for adapting and joining two pieces of titanium, tantalum, zirconium or stainless steel tubing of different diameters and more particularly to a device which utilizes nontitanium, nontantalum, nonzirconium or nonstainless steel components to accomplish the result.

Fluid handling and carrying operations often require the use of pipes or tubing made of noncontaminative specialty metals, so as to impart to impurities to the fluid being transported. Titanium, tantalum, zirconium or stainless steel are metals which are particularly desirable for transporting a variety of fluids, most notably distilled water. However, these metals are extremely expensive and therefore any coupling method which minimizes the amount of this metal used will result in substantial cost savings. A method and a device suitable for creating joints between pipe and a coupling member are disclosed in U.S. Pat. Nos. 3,943,616 and 3,888,519 respectively. However, such inventions are not practical for joining solid pieces of piping because the aforementioned inventions relate to pipes having only a thin lining of tin, titanium or other specialty metal and they require the peeling back of the outer base-metal jacket of the pipe to expose the inner lining. In the case of solid titanium, tantalum, zirconium, stainless steel pipes or tubings, the stripping back of the outer jacket of the pipe would involve removal of the expensive metal itself.

Another problem encountered in the past was the inability to join a piece of metal tubing to a standard size metal pipe elbow or T. This was so because the usual wide difference in size between the standard pipe fitting and a typical thin-walled tubing would preclude the formation of a tight-fitting, mechanically sound joint. In such a case a special fitting, tailor made for the particular size tubing being joined, would have to be used in order to accomplish the joint.

An adapting and joining arrangement in accordance with the present invention solves the above-mentioned problems in a simple and efficient manner. The object of the invention is to provide a means of adapting a section of titanium, tantalum, zirconium or stainless steel tubing to a larger sized titanium, tantalum, zirconium or stainless steel tubing to achieve a leak-tight, mechanically sound and structurally strong joint, while utilizing components in certain non-contaminative areas which are made of materials other than titanium, tantalum, zirconium or stainless steel so as to reduce the cost of the joint.

It is another object of this invention to provide a connection between commonly available standard titanium, tantalum, zirconium or stainless steel pipe joints and a range of variously sized titanium, tantalum, zirconium or stainless steel tubings without having to resort to a specially made, highly expensive adapter made of these metals.

SUMMARY OF THE INVENTION

It is desired to join a section of titanium, tantalum, zirconium or stainless steel tubing to a second section of titanium, tantalum, zirconium or stainless steel tubing, which second section has an inner diameter considerably larger than the outside diameter of the first section. A nontitanium, nontantalum, nonzirconium or nonstainless steel ferrule slidably engages the outer surface of the first section of titanium, tantalum, zirconium or stainless steel tubing. This ferrule has a tapered outer surface which generally conforms to the opening of the larger section of titanium, tantalum, zirconium or stainless steel tubing. A nontitanium, nontantalum, nonzirconium or nonstainless steel mechanical stop fixedly attached to the outer surface of the first section of titanium, tantalum, zirconium or stainless steel tubing limits the longitudinal movement of the ferrule along this section, so that when the first section is inserted into the larger section the ferrule will engage snugly and align itself with the opening of the larger section and will be pushed along the first section until stopped by this mechanical stop. In this way there is provided a continuity of mechanical support between the two sections of tubing to provide structural strength. A sealing means made of noncontaminating material is also fixedly attached to the outer surface of the first section of tubing. The sealing means is located between the ferrule and the end of the first section of tubing which will be inserted into the larger section. This sealing means will provide a fluid-tight seal between the outer surface of the first secton of tubing and the inner surface of the second section of tubing when the two sections are joined. Finally, there is a nontitanium, nontantalum, nonzirconium or nonstainless steel coupling means which will maintain the first and second sections securely in their assembled position. By this technique there is created a rigid mechanical bond between the two sections of titanium, tantalum, zirconium or stainless steel tubing despite the disparity in size, and there is also provided a fluid-tight seal which prevents the distilled water or other fluid being carried by the titanium, tantalum, zirconium or stainless steel tubings from coming into contact with the nontitanium, nontantalum, nonzirconium or nonstainless steel ferrule, stop and coupling means.

This arrangement also may be used to join a section of titanium, tantalum, zirconium or stainless steel tubing to an otherwise oversized pipe fitting by choosing an appropriately sized ferrule. This arrangement not only results in significant cost savings through use of cheaper, yet structurally adequate, materials for non-critical components, but it also affords the pipefitter greater flexibility as far as being able to adapt to a wide spectrum of coupling requirements.

BRIEF DESCRIPTION OF THE DRAWING

The several features and advantages of this adapting and coupling arrangement, constructed in accordance with the invention, will be more readily understood and appreciated from the following detailed description of the preferred embodiments, herein selected for purpose of illustration, as shown in the accompanying drawings, in which.

DESCRIPTION OF THE PREFERRED EMBODIMENT

Figure 1:
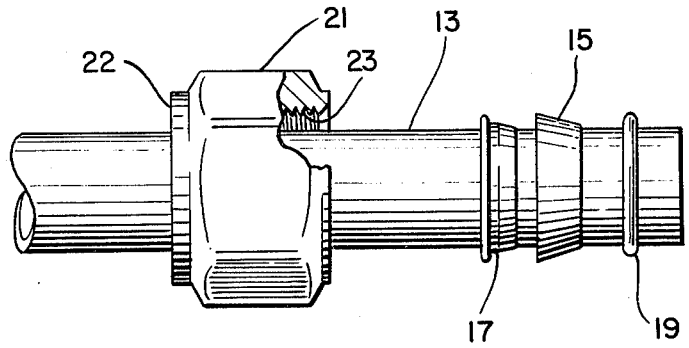
FIG. 1 is a perspective view of an adapting and coupling arrangement assembled onto a titanium, tantalum, zirconium or stainless steel tubing in accordance with the present invention.

As shown in FIG. 1, a section of titanium, tantalum, zirconium or stainless steel tubing 13 has a ferrule 15, made of a nontitanium, nontantalum, nonzirconium or nonstainless steel material such as iron loosely engaged about its outer surface. The outer surface of ferrule 15 which is instrumental in forming a mechanically sound joint, is tapered to present the appearance of a truncated cone, with the narrow end of the taper pointing toward the joint, in order to adapt itself to a limited range of inner diameters of either pipe fittings or larger sections of titanium, tantalum, zirconium or stainless steel tubing to which section 13 will be joined. Mechanical stop 17, also made of a nontitanium, nontantalum, nonzirconium or nonstainless steel material such as iron is fixedly attached to the outer surface of tubing 13 and it provides a limitation on the movement of ferrule 15 longitudinally along the length of tubing 13, in the direction away from the joint. Ferrule 15 is able to pivot to a limited degree with respect to the longitudinal axis of tubing 13 so as to align itself according to the uneven contours of the mating piece of tubing or pipe fitting. Typical dimensions used in a particular embodiment of the invention would be: a $\frac{3}{4}$ inch outer diameter for tubing 13; a 49/64 inch inner diameter for ferrule 15; and an outer diameter for ferrule 15 ranging from 15/16 inch at the broad end of the taper to 25/32 inch at the narrow end. This arrangement would permit formation of a joint with a second piece of titanium, tantalum, zirconium or stainless steel tubing having a nominal inner diameter of $\frac{7}{8}$ inch, while increasing the size range of the outer diameter of ferrule 15 would accommodate even larger tubings. A flexible O-ring 19 made of a noncontaminating material, such as neoprene or a similar synthetic rubber, which will not react with the fluids being transported by the titanium, tantalum, zirconium or stainless steel tubing is fixedly attached to the outer surface of tubing 13 by means of a retaining groove (see FIG. 2). Not only is the outer diameter of O-ring 19 larger than the outer diameter of tubing 13 but it is also slightly larger than the inner diameter of the mating tubing or pipe fitting, so as to be compressed between the inner surface of the mating tubing and the outer surface of tubing 13 to provide a fluid-tight seal when the two portions of tubing are joined, as will be discussed hereinafter. A typical O-ring in a particular embodiment of the present invention would present an outer diameter of $\frac{7}{8}$ inch when attached to tubing 13 having an outer diameter of $\frac{3}{4}$ inch. Coupling nut 21 which is also of a nontitanium, nontantalum, nonzirconium or nonstainless steel material such as iron or steel loosely engages the outer surface of tubing 13. A flange 22, integrally formed with coupling nut 21, limits the approach of coupling nut 21 toward the joint, by contact with mechanical stop 17. The inner circumference of coupling nut 21 has a thread 23 designed to mate with a matching thread on the outer surface of the pipe fitting or tubing to which the joint will be made. This threaded portion of nut 21 can extend beyond mechanical stop 17 toward the joint, far enough to be able to surround all of ferrule 15 when the joint is completed, but not far enough to encompass any portion of O-ring 19. As will become evident later with reference to FIG. 3, once tubing 13 has been completely inserted into the mating tubing, coupling nut 21 will be moved into position abutting mechanical stop 17 and then will be engaged by means of its internal thread 23 with the thread on the mating portion of tubing and tightened until a rigid mechanical connection has been made.

Figure 2:
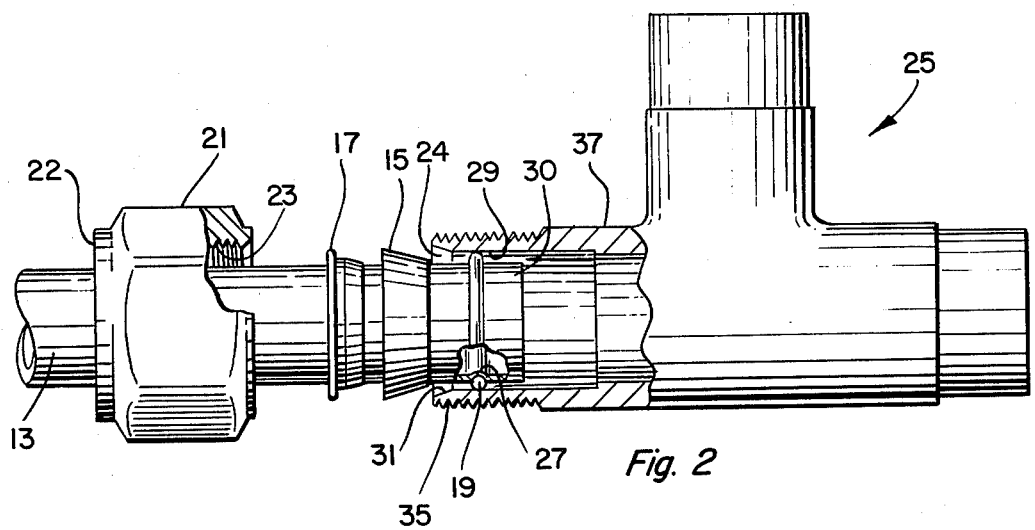
FIG. 2 is a front elevation view, in section, of a partially joined titanium, tantalum, zirconium or stainless steel tubing and titanium, tantalum, zirconium or stainless steel pipe fitting, in accordance with the invention.

Referring now to FIG. 2, tubing 13 along with attached O-ring 19 has been inserted into the bore 24 of titanium, tantalum, zirconium or stainless steel pipe fitting 25 to which it will be finally joined. O-ring 19, fitting snugly in its retaining groove 27, has been compressed between the inner surface 29 of pipe fitting 25 and the outer surface 30 of tubing 13. At this point in the assembly process tubing 13 is still free to pivot with respect to the bore 24 of pipe fitting 25 using the O-ring 19 as a fulcrum. Therefore, although a fluid-tight seal has been formed between the outer surface 30 of tubing 13 and the inner surface 29 of pipe fitting 25, a mechanically rigid joint has not yet been formed.

Figure 3:
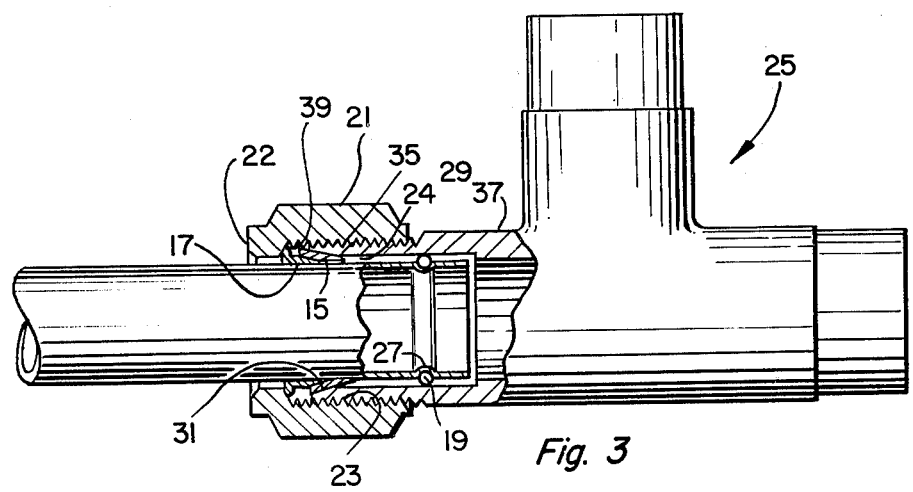
FIG. 3 is a front elevation view, in section, of a completely joined titanium, tantalum, zirconium or stainless steel tubing and titanium, tantalum, zirconium or stainless steel pipe fitting in accordance with the invention.

Referring now to FIG. 3, tubing 13 has been moved further along the bore 24 of pipe fitting 25 until it has reached its final position. The tapered surface of ferrule 15 has made contact with a tapered shoulder 31 (see also FIG. 2) formed in the inner surface 29 of pipe fitting 25. Ferrule 15 has pivoted slightly with respect to the axis of tubing 13, using mechanical stop 17 as a pivot point, so as to align itself perfectly with the contours of tapered shoulder 31. Now in addition to the fluid-tight seal there is also a continuous mechanical load support from the inner surface 29 of pipe fitting 25 through ferrule 15 into the mechanical stop 17 and finally into titanium, tantalum, zirconium or stainless steel tubing 13. Coupling nut 21 has been moved into position so that its inner thread 23 is engaged with the mating thread 35 cut into the outer surface 37 of pipe fitting 25. As the coupling nut 21 is turned to further engage the threads, an inner surface 39 of flange 22 is driven against mechanical stop 17, in turn forcing ferrule 15 firmly against tapered shoulder 31, thereby insuring a solid mechanical joint. Once coupling nut 21 has been twisted to its final position, the relative positions of tubing 13 and pipe fitting 25 will have been set rigidly so that there will be no movement to cause deterioration of the fluid-tight seal between the two joined members.

It is readily obvious that judicious selection of an appropriately sized ferrule and an appropriately sized O-ring will permit tubing 13 to be inserted into and permanently joined to either a pipe fitting or a larger titanium, tantalum, zirconium or stainless steel tubing having an inner diameter within a considerable range. This obviates the requirement of using a specially tooled and fabricated titanium, tantalum, zirconium or stainless steel tubing fitting which has an inner diameter designed to engage snugly the outer surface of the titanium, tantalum, zirconium or stainless steel tubing to be joined. This allows the pipe fitter in practice to adapt the particular size titanium, tantalum, zirconium or stainless steel tubing being used to available standard size titanium, tantalum, zirconium or stainless steel pipe fittings, thereby allowing a considerably smaller inventory of fittings and tubings to be maintained. Because the sealing feature of O-ring 19 prevents passage of fluids beyond its location, coupling nut 21, ferrule 15, and mechanical stop 17 can be made of nontitanium, nontantalum, nonzirconium or nonstainless steel materials, thereby drastically reducing the cost of making the joint.

It should be understood, of course, that the foregoing disclosures relate only to the preferred embodiment of the invention and that it is intended to cover all changes and modifications of the example of the invention herein chosen, within the purposes of the disclosures, which do not constitute departures from the spirit and scope of the invention.

We claim:

1. An adapting and coupling arrangement for forming a firm mechanical joint between a first section of tubing of a metal selected from a group consisting of titanium, tantalum, zirconium and stainless steel and a second section of tubing of a metal selected from said group, said second section having an open end adapted to telescopingly receive said first section, each of said first and second sections of tubing having inner and outer surfaces, comprising a sealing means made of noncontaminating material, mounted on said outer surface of said first section for providing a fluid-tight seal between said outer surface of said first section of tubing and said inner surface of said second section of tubing when said second section telescopically receives said first section, a mechanical stop, fixedly attached against movement relative to said outer surface of said first section of tubing at a location farther from said second section than said sealing means, a ferrule having
 an inner surface arranged so that said ferrule loosely slidably engages said outer surface of said first section of tubing at a location between said sealing means and said mechanical stop,
 a pivoting surface facing said mechanical stop and adapted to engage said mechanical stop so that said ferrule pivots on said mechanical stop, and
 an outer tapered surface having a narrow end facing said second section of tubing for conformably, pivotally engaging said inner surface of said second section at said open end, and coupling means mounted on one of said first and second sections of tubing and adapted to engage the other of said first and second sections to draw said first and second sections together, causing said ferrule to engage said mechanical stop and said inner surface of said second section whereby said pivoting movement is produced, said ferrule, said inner surface of said second section at said open end, said mechanical stop, and said first section of tubing being arranged to be in an overlapping weded relation with each other when said first and second sections of tubing are drawn together by said coupling means to form said firm mechanical joint.

* * * * *